(12) United States Patent
Rosén et al.

(10) Patent No.: US 11,927,930 B2
(45) Date of Patent: Mar. 12, 2024

(54) CONTROLLING HEAT OUTTAKE FROM A HEAT DISTRIBUTION SYSTEM

(71) Applicant: E.ON SVERIGE AB, Malmo (SE)

(72) Inventors: Per Rosén, Lund (SE); Jacob Skogstrom, Lomma (SE); Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 380 days.

(21) Appl. No.: 17/250,906

(22) PCT Filed: Sep. 13, 2019

(86) PCT No.: PCT/EP2019/074551
§ 371 (c)(1),
(2) Date: Apr. 2, 2021

(87) PCT Pub. No.: WO2020/064371
PCT Pub. Date: Apr. 2, 2020

(65) Prior Publication Data
US 2021/0397147 A1 Dec. 23, 2021

(30) Foreign Application Priority Data
Sep. 25, 2018 (EP) .................................... 18196426

(51) Int. Cl.
*F24D 10/00* (2022.01)
*F24D 19/10* (2006.01)
(Continued)

(52) U.S. Cl.
CPC .......... *G05B 19/042* (2013.01); *F24D 10/003* (2013.01); *F24D 19/10* (2013.01);
(Continued)

(58) Field of Classification Search
CPC .......... G05B 19/042; G05B 2219/2614; F24D 10/003; F24D 19/10; F24D 2200/13;
(Continued)

(56) References Cited

U.S. PATENT DOCUMENTS

| | | | |
|---|---|---|---|
| 4,023,043 A * | 5/1977 | Stevenson | H02J 3/144 307/38 |
| 2014/0277769 A1* | 9/2014 | Matsuoka | G05B 13/0265 700/278 |

(Continued)

FOREIGN PATENT DOCUMENTS

| | | |
|---|---|---|
| DE | 10226755 | 2/2004 |
| EP | 2818801 | 12/2014 |

(Continued)

OTHER PUBLICATIONS

International Search Report and Written Opinion of PCT/EP2019/074551, dated Nov. 26, 2019, in 10 pages.

*Primary Examiner* — Michael W Choi
(74) *Attorney, Agent, or Firm* — Knobbe, Martens, Olson & Bear, LLP

(57) ABSTRACT

The disclosure relates to a method for controlling a heat distribution system. The method comprises: determining a time period of forecasted elevated overall outtake of heat from a district thermal energy distribution grid (110) by local heat distribution systems (150) connected to the district thermal energy distribution grid (110); determining, at a control sewer (130), a control signal associated with a respective one of a plurality of local control units (140), wherein each respective control signal is time resolved and comprises information pertaining to a temporary increase in heat outtake from the district thermal energy distribution grid (110) before the determined time period, and information pertaining to a temporary decrease in heat outtake from the district thermal energy distribution grid (110) during the
(Continued)

determined time period; sending each respective control signal from the control sewer (130) to the respective local control unit (140); receiving the respective control signal at the respective local control unit (140); and regulating, at each respective local control unit (140) and based on the respective control signal, the outtake of heat by the respective local heat distribution system (150) from the district thermal energy distribution grid (110).

12 Claims, 3 Drawing Sheets

(51) Int. Cl.
    *G05B 19/042*     (2006.01)
    *G05D 23/19*     (2006.01)

(52) U.S. Cl.
    CPC ..... *G05D 23/1904* (2013.01); *F24D 2200/13* (2013.01); *G05B 2219/2614* (2013.01)

(58) Field of Classification Search
    CPC .. G05D 23/1904; G06Q 50/06; G06Q 10/063; Y02B 30/17; Y02E 20/14
    See application file for complete search history.

(56) References Cited

U.S. PATENT DOCUMENTS

| | | |
|---|---|---|
| 2017/0198932 A1 | 7/2017 | Sato et al. |
| 2019/0154288 A1* | 5/2019 | Adirim ................. F24D 10/00 |

FOREIGN PATENT DOCUMENTS

| | | |
|---|---|---|
| EP | 3082010 | 10/2016 |
| JP | 2013-119973 A | 6/2013 |
| JP | 2017-223394 A | 12/2017 |
| WO | WO 2012074478 | 6/2012 |
| WO | WO 2013/084435 A1 | 6/2013 |
| WO | WO 2016/020953 A1 | 2/2016 |
| WO | WO 2017/002153 A1 | 1/2017 |

\* cited by examiner

CONTROLLING HEAT OUTTAKE FROM A HEAT DISTRIBUTION SYSTEM

FIELD OF INVENTION

The invention relates to controlling of heat outtake from a heat distribution system.

TECHNICAL BACKGROUND

Within the field of comfort heating, it is a well-known phenomenon that demand for comfort heating may be heavily dependent on outer factors. For example, demand for comfort heating may be higher on a cold day, or on a day with weather phenomena such as blizzards or rainstorms. Demand for comfort heating and hot tap water varies over a day due to human behavior and habits, e.g. many people have the habit of taking a shower in the morning. Further, demand for comfort heating may decrease during holidays, when occupants of residential buildings typically gather in larger groups, thus occupying fewer residences. Events such as sporting events or parades may also cause occupants to leave their homes in large numbers. A problem occurs when a peak in demand must be handled, as fast-acting heating systems may typically be more expensive and less environmentally friendly to run than their slower counterparts. For instance, oil or gas production plants may be faster to act than more environmentally friendly biomass fueled plats or geothermal heating plants, etc. Furthermore, it may be expensive to run said production plants at max capacity to compensate for the demand. Therefore, a need exists for a better way to heat buildings when there is a peak in demand.

SUMMARY OF INVENTION

It is an object of the invention to at least mitigate some of the above mentioned problems.

According to a first aspect a method for controlling a heat distribution system is provided. The controlled heat distribution system comprises a district thermal energy distribution grid for a fluid based distribution of heat, one or more production plants configured to produce heat and to deliver the heat to the district thermal energy distribution grid, and a plurality of local control units, each local control unit being associated with a local heat distribution system, the local heat distribution system being configured to distribute comfort heating in one or more buildings associated to the local heat distribution system, each local control unit further being configured to control the outtake of heat of the associated local heat distribution system from the district thermal energy distribution grid. The method comprises:

determining a time period of forecasted elevated overall outtake of heat from the district thermal energy distribution grid by local heat distribution systems connected to the district thermal energy distribution grid;

determining, at a control server, a control signal associated with a respective one of the plurality of local control units, wherein each respective control signal is time resolved and comprises information pertaining to a temporary increase in heat outtake from the district thermal energy distribution grid before the determined time period, and information pertaining to a temporary decrease in heat outtake from the district thermal energy distribution grid during the determined time period;

sending each respective control signal from the control server to the respective local control unit;

receiving the respective control signal at the respective local control unit; and regulating, at each respective local control unit and based on the respective control signal, the outtake of heat by the respective local heat distribution system from the district thermal energy distribution grid.

It will be appreciated that the term "heat distribution system" relates any system for distributing thermal energy in the form of heat.

I will be appreciated that the term "heat" is interpreted as energy for changing a temperature in a building, by increasing the temperature.

A "local control unit" may be any type of processing unit adapted for controlling a local distribution system. A local control unit may be used for one or a plurality of local distribution systems.

A "production plant" may be any type of production plant suitable for producing heat and for delivering the heat to a distribution grid. The production plant comprises one or more generators for heat. Each generator may be run independently of the other generators at the production plant. The "distribution grid" may be any means for distributing heat via a feed of a heat transfer fluid to a building or system.

By "outtake" is meant a local heat distribution system's consumption or use of heat from the district thermal energy distribution grid.

An "overall outtake of heat" is the overall outtake of heat by all local heat distribution systems connected to the district thermal energy distribution grid. The overall outtake of heat by all local heat distribution systems connected to the district thermal energy distribution grid may vary over time.

By "elevated" is meant an overall outtake of heat being above a base production capacity of the one or more heat production plants. The outtake of heat may be determined as being elevated if it is above the base production capacity. The base capacity may be set as a percentage of the total capacity of the one or more heat production plants.

By "capacity" is meant the current or forecasted capacity of the production plant to produce heat. The capacity may have one value if the production plant is operating at a normal level, and may be decreased if the production plant operation level is reduced or disturbed. It may also be increased if the capacity is increased, for example, if an additional generator of heat is started.

By "forecasted" is meant the system's knowledge of an expected future outtake of heat from the district thermal energy distribution grid. The knowledge may be based on information from individual local heat distribution systems forecasted outtake of heat. Any such forecast may be based on historical data of previous outtake of heat by the individual local heat distribution systems. Any such historical data may be linked to specific time events, such a day of the week, day of the month, time of the day, etc. The knowledge may additionally or alternatively be based on weather forecast data. The forecast may also be based on knowledge about production of the one or more heat production plants, for example, that a generator is scheduled for maintenance at a certain time.

A "control server" may be any type of device comprising a processing unit suitable for performing at least some of the acts of the method specified above. The control server may be one or more servers. The control server may be central control server, "central" in the sense that it may handle data for a plurality of local control units.

The "control signal" may be any signal for communicating between the control server and the plurality of local control units. It may, for example, be an analog or a digital signal.

By the method according to this first aspect, prediction of demand peaks due to environmental events, such as e.g. weather phenomena, and/or due to behavior and habits of the consumers, may be used to efficiently utilize heating facilities such as production plants in the local distribution system. Once such demand peaks are predicted, the thermal inertia of buildings may be used to minimize the use of more expensive or environmentally harmful heat production facilities by pre-heating the buildings for a period of time before the predicted peak in demand. The buildings being heated before the determined time period may result in the storing of thermal energy in the structure of the building. When the period of elevated overall outtake occurs, thermal energy has already been stored in the buildings and the outtake from the distribution system may be reduced for that period. Thus, the need for more expensive and/or harmful heating facilities may be reduced. It is also possible to use the method if it is known beforehand that the regular means of heat production are to be shut down, e.g. for maintenance, and thus rely less on reserve systems which may be more expensive or less environmentally friendly to use. Using the thermal inertia of the building in this way enables optimization when selecting production plants.

Further, in a case the production capacity of the production plants is limited, and/or the distribution capacity of the district thermal energy distribution grid is limited, the present method allows for distributing the available heat and/or distribution capacity to all the connected local heat distribution systems. This since demand peak may be evened out using the pre-heating according to the present method. This shall be compared with the present situation wherein in case of a demand peak, the pressure of district thermal fluid of the district thermal energy distribution grid may, in an uncontrolled manner, be too low in parts of the district thermal energy distribution grid. Especially in parts far away from the production plants. This leads to that local heat distribution systems connected to the district thermal energy distribution grid in parts thereof wherein the pressure of the district thermal fluid is too low will not get any heat, neither for comfort heating nor for hot tap water production. The present method allows to control the outtake of heat so that every local heat distribution system can access heat, but to a limited extent, regardless of where on the district thermal energy distribution grid the local heat distribution system is connected. Hence, the present method allows for an uninterruptible distribution of heat.

The time resolved control signal may be used to control a local distribution grid over time. This enables for the heat distribution system to be controlled over a period of time without maintaining continuous contact between the local control unit and the control server where the control signal is determined. This may save on bandwidth, and may increase redundancy as the local control unit may continue to control the local heat distribution system over time even if there is a loss of communication between the control server and the local control unit. For example, if the control signal were to comprise only a momentary control signal and there was a loss of communication from the control server, the local heat distribution system would risk being placed in a state of increased outtake from the district thermal energy distribution grid without then being subsequently directed to decrease outtake. If the control signal is instead a time resolved control signal, it needs only to be received once in order for the desired effect on the outtake from the district thermal energy distribution grid to be enabled.

By determining the time resolved control signal at the control server the need for communication between the different parts of the heat distribution system may be reduced. This since the time resolved control signal may be determined by the same entity that holds the forecast data. Otherwise, the forecast data would need to have been transmitted to the entity determining the time resolved control signal.

The time period of forecasted elevated overall outtake of heat may be in the range of 1 hour to 12 hours.

The time period of the increase in heat outtake from the district thermal energy distribution grid before the determined time period of forecasted elevated overall outtake of heat may be in the range of 25-150% of the determined time period of forecasted elevated overall outtake of heat.

Each respective control signal may further comprise information pertaining to a temporary increase in heat outtake from the district thermal energy distribution grid after the determined time period of forecasted elevated overall outtake of heat. Hence, the method may further provide for the step of temporarily increasing heat outtake for comfort heating in the one or more buildings after the determined time period of forecasted elevated overall outtake of heat. This may be done to make up for a loss of thermal energy from the buildings during the phase where the heating has been reduced, when conditions are more suitable for heating again. This may be referred to as after-heating. By using both pre-heating and after-heating the thermal inertia in a building may be utilized to a greater extent.

The time period of the temporary increase in heat outtake from the district thermal energy distribution grid after the determined time period of forecasted elevated overall outtake of heat may be in the range of 25-150% of the determined time period of forecasted elevated overall outtake of heat.

The temporary increase in heat outtake from the district thermal energy distribution grid after the determined time period of forecasted elevated overall outtake of heat may be symmetric in time with respect to the temporary increase in heat outtake from the district thermal energy distribution grid before the determined time period of forecasted elevated overall outtake of heat.

The temporary increase in heat outtake from the district thermal energy distribution grid after the determined time period of forecasted elevated overall outtake of heat may be symmetric in heat outtake with respect to the temporary increase in heat outtake from the district thermal energy distribution grid before the determined time period of forecasted elevated overall outtake of heat.

A length of the time period of temporary increase in outtake of heat may be dependent on a value of thermal inertia of the building being heated by the respective local distribution system.

The time period of forecasted elevated overall outtake of heat from the district thermal energy distribution grid may be a time period during which the overall outtake of heat from the district thermal energy distribution grid is above a predetermined threshold.

The predetermined threshold may be a relative threshold based on a relative amount of energy outtake from the district thermal energy distribution grid compared with a total amount of available energy in the district thermal energy distribution grid.

The relative threshold may be in the range of 75-90% of a total amount of available energy in the district thermal energy distribution grid.

The act of determining the time period of forecasted elevated overall outtake of heat from the district thermal energy distribution grid by local distribution systems connected to the district thermal energy distribution grid may be based on weather forecast data. Hence, weather forecasts may be used to predict peaks in demand for comfort heating due to weather phenomena such as blizzards, rainstorms or other weather-related instances where it is likely that outtake of heat will be elevated for a time period.

The act of determining the time period of forecasted elevated overall outtake of heat from the district thermal energy distribution grid by local distribution systems connected to the district thermal energy distribution grid may be based on pre-recorded time resolved historical data pertaining to historical overall outtake of heat of local distribution systems connected to the district thermal energy distribution grid. In this way, it is possible to predict peaks in demand before they occur. The method may be more efficient the farther ahead of time it is known that a peak in demand is likely to occur. Therefore, it may be gainful to use forecasts of different kinds to predict such peaks. Also, approximating for how long a peak in demand will last may allow for more precise control of the pre-heating process (and possibly additional after-heating process)—for a shorter lasting peak, less pre-heating (after-heating) may be optimal. For a longer lasting peak, more pre-heating (after-heating) may be optimal. Further, this may allow for compensation of demand peaks which are due to non-weather-related but regularly occurring phenomena such as working days, holidays, or irregular phenomena with similarities in the need for comfort heating, such as sporting events. It may be noted that some such pre-recorded time resolved data may be disconnected from weather data. It may e.g. relate to the overall difference in the overall heating need dependent upon if a day is a holiday or a working day. Some such data may be pre-recorded in associating with weather data such that the control signal may be based on an association of the pre-recorded data and the weather forecast. It may e.g. take into account how a specific weather phenomenon may result in different overall outtake of heat dependent upon if the day is a holiday of a working day. This pre-recorded time resolved data pertaining to the outtake of heat of one or more specific local distribution systems from the distribution grid may be disconnected from or associated with weather data similarly to how the pre-recorded time resolved data pertaining to the overall outtake of heat of the local distribution systems from the distribution grid may be disconnected from or associated with weather data.

The act of predicting the time period of forecasted elevated overall outtake of heat from the distribution grid may be performed at the control server acting as a forecast server. The control server may then be seen as a central control server. Using a central control server enables for data from many local distribution systems to be analyzed, as opposed to analysis being performed only on historical data from the building being regulated. For example, it may be the case that buildings connected to the thermal distribution grid experience demand peaks due to some propagating fault in the distribution grid. Such a peak in demand could be predicted by a control server connected to several buildings but not by a method comprising only data for one single building. Using a control server for many local distribution systems also reduces the need for expensive equipment, i.e. the server itself, by centralizing such equipment.

The method may further comprise:
determining forecast data pertaining to expected production capacity of heat in the one or more production plants; and
determining forecast data pertaining to expected overall outtake of heat over time from the district thermal energy distribution grid by local heat distribution systems connected to the district thermal energy distribution grid,
wherein the time period of forecasted elevated overall outtake of heat may be determined based on the expected overall outtake being temporarily elevated relative to the expected production capacity.

The respective control signal comprises information pertaining to a temperature offset. The temperature offset mat be in absolute numbers or in relative terms. By only sending a temperature offset enables a communication between the control server and the local control units being of relatively small size. This may save on bandwidth in the communication. Further, by using a temperature offset as the control signal an easy control protocol may be used. The control server does not need to know any data about the local heat distribution system.

The method may further comprises determining a respective temperature outside the respective one or more buildings associated with a local control unit, wherein each local control unit is configured to control the associated local distribution system's outtake of heat from the district thermal energy distribution grid based on the respective determined temperature and the information pertaining to the temperature offset.

According to a second aspect a heat distribution system is provided. The heat distribution system comprises:
a district thermal energy distribution grid for a fluid based distribution of heat;
a plurality of local control units, each local control unit being associated with a local heat distribution system, the local heat distribution system being configured to distribute comfort heating in one or more buildings associated to the local heat distribution system, each local control unit further being configured to control the outtake of heat of the associated local heat distribution system from the district thermal energy distribution grid, and
a server having a processing unit configured to:
determine a time period of forecasted elevated overall outtake of heat from the district thermal energy distribution grid by local heat distribution systems connected to the district thermal energy distribution grid;
determine a control signal associated with a respective one of the plurality of local control units, wherein each respective control signal is time resolved and comprises information pertaining to a temporary increase in heat outtake from the district thermal energy distribution grid before the determined time period, and information pertaining to a temporary decrease in heat outtake from the district thermal energy distribution grid during the determined time period;
wherein the server further comprises a communication module configured to send each respective control signal from the server to the respective local control unit, wherein the respective local control unit further comprises:
a communication module configured to receive the respective control signal, and
a heat extractor configured to regulate the outtake of heat by the respective local heat distribution system from the district thermal energy distribution grid based on the respective control signal.

The above mentioned features of the method, when applicable, apply to this second aspect as well. In order to avoid undue repetition, reference is made to the above.

According to a third aspect a server is provided. The server comprises:
a processing unit configured to:
determine a time period of forecasted elevated overall outtake of heat from a district thermal energy distribution grid by local heat distribution systems connected to the district thermal energy distribution grid, and
determine a control signal associated with a respective one of a plurality of local control units, wherein each respective control signal is time resolved and comprises information pertaining to a temporary increase in heat outtake from the district thermal energy distribution grid before the determined time period, and information pertaining to a temporary decrease in heat outtake from the district thermal energy distribution grid during the determined time period; and
a communication module configured to send each respective control signal from the server to the respective local control unit.

The above mentioned features of the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures showing embodiments. The figures should not be considered limiting; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
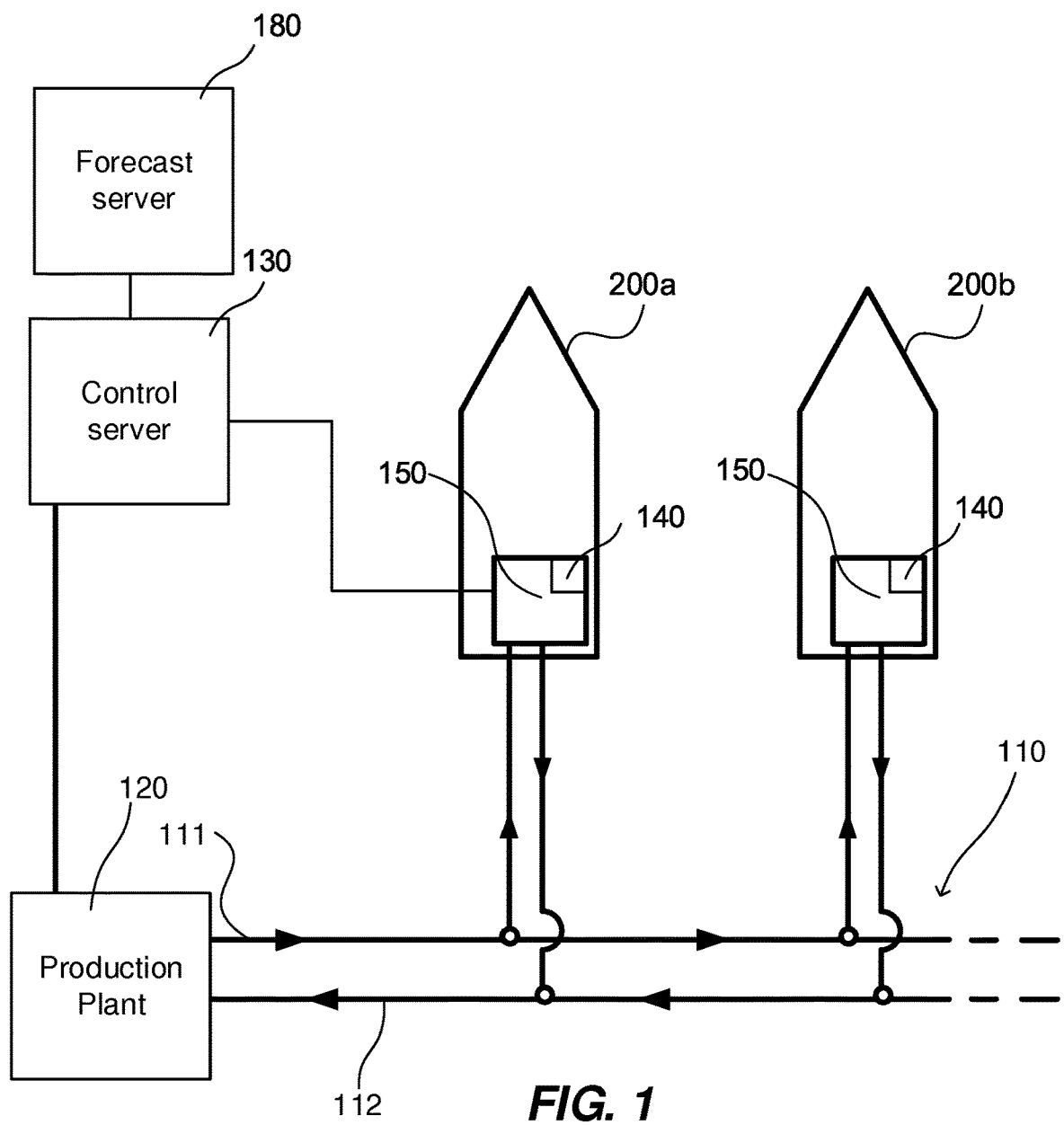
FIG. 1 is a schematic illustration of district thermal energy distribution system.

FIG. 1 shows a district thermal energy distribution system, comprising a district thermal energy distribution grid 110 and a production plant 120.

The production plant 120 is configured to produce heat. The produced heat is used for heating district thermal fluid circulated in the district thermal energy distribution grid 110. The production plant 120 may be a geothermal plant, an electrically powered plant for heating fluids, or may be driven by combustion of fuels such as gas or oil. It is only important that the production plant 120 is configured to heat the district thermal fluid of the district thermal energy distribution grid 110. The district thermal energy distribution system may comprise more than one production plant 120.

The district thermal energy distribution grid 110 comprises a main line 111 configured to feed district thermal fluid from the production plant 120 to local heat distribution systems 150 connected to the district thermal energy distribution grid 110. The district thermal energy distribution grid 110 further comprises a return line 112 configured to return district thermal fluid from the local heat distribution systems 150 to the production plant 120. The district thermal fluid may be any fluid suitable for transporting thermal energy. According to a non-limiting example, the district thermal fluid is water. However, according to other embodiments other district thermal fluid may be used. Some non-limiting examples are ammonia, oils, alcohols and anti-freezing liquids such as glycol. The heat transfer liquid may also comprise a mixture of two or more of the heat transfer liquids mentioned above, such as water mixed with an anti-freezing liquid or an anti-corrosion liquid.

A plurality of local heat distribution systems 150 are connected to the district thermal energy distribution grid 110. Each local heat distribution system 150 is associated with one or more buildings 200. A specific building 200 may be any type of building, such as a residential building, commercial or office building, an apartment building, a free-standing house or an industrial building.

The district thermal energy distribution system further comprises a forecast server 180. The forecast server 180 may be any type of server comprising a processing unit. The forecast server 180 may physically comprise one single server device. Alternatively, the forecast server 180 may be distributed over several server devices. The forecast server 180 may be comprised in a production plant 120, or at any other suitable location.

The forecast server 180 is configured to determine a time period of forecasted elevated overall outtake of heat from the district thermal energy distribution grid 110 by local heat distribution systems 150 connected to the district thermal energy distribution grid 110. Typically, the time period of elevated overall outtake of heat is in the range of 1 hour to 12 hours. The overall outtake of heat from the district thermal energy distribution grid 110 by local heat distribution systems 150 connected to the district thermal energy distribution grid 110 is a measure of total outtake of heat from the local heat distribution systems 150 connected to the district thermal energy distribution grid 110. The overall outtake of heat from the district thermal energy distribution grid 110 may vary over time.

The overall outtake of heat from the district thermal energy distribution grid 110 by local heat distribution systems 150 connected to the district thermal energy distribution grid 110 typically varies over time. The variation over time may depend on many factors. One such factor may be change in weather conditions, e.g. ambient temperature, wind conditions, amount of clouds, etc. For example, in times of relatively low ambient temperature the overall heat outtake by local heat distribution systems 150 connected to the district thermal energy distribution grid 110 will be elevated as compared with times of relatively high ambient temperature. Further, for example, in times of relatively high wind speeds the overall heat outtake by local heat distribution systems 150 connected to the district thermal energy distribution grid 110 will be elevated as compared with times of relatively low wind speeds. Another factor influencing variations in overall outtake of heat from the district thermal energy distribution grid 110 by local heat distribution systems 150 connected to the district thermal energy distribution grid 110 may be time factors, such as time of the day, day of the week, month of the years, etc. For example, there may be an elevated need of heat during morning and evening hours, at least for a district thermal energy distribution system configured to deliver heating to an area having a majority of residential buildings, especially if the local heat distribution systems 150 also are configured to provide hot tap water. Further, for example, there may be an elevated outtake of heat from the district thermal energy distribution grid 110 during holiday seasons, again at least for a district thermal energy distribution system configured to deliver heating to an area having a majority of residential buildings. Hence, the overall outtake of heat from the district thermal energy distribution grid 110 may depend on historical overall outtake of heat of local distribution systems 150 connected to the district thermal energy distribution grid 110. Data pertaining to such historical overall outtake of heat may be pre-recorded time resolved historical data. The historical data may pertain to outtake at specific local distribution systems 150. The historical data may pertain to overall heat outtake from the distribution grid 110.

The forecast server 180 may be configured to determine forecast data pertaining to expected overall outtake of heat over time from the district thermal energy distribution grid 110 by local heat distribution systems connected to the district thermal energy distribution grid 110. From this forecast data, the forecast server 180 may be configured to determine the time period of forecasted elevated overall outtake of heat from the district thermal energy distribution grid 110 by local heat distribution systems 150 connected to the district thermal energy distribution grid 110. The time period of forecasted elevated overall outtake of heat from the district thermal energy distribution grid 110 may be a time period during which the overall outtake of heat from the district thermal energy distribution grid 110 is above a predetermined threshold. The predetermined threshold may be an absolute threshold, hence an amount of energy outtake from the district thermal energy distribution grid 110. The predetermined threshold may be a relative threshold, hence a relative amount of energy outtake from the district thermal energy distribution grid 110 compared with a total amount of available energy in the district thermal energy distribution grid 110. The relative threshold may e.g. be in the range of 75-90% total amount of available energy in the district thermal energy distribution grid 110. The total amount of available energy in the district thermal energy distribution grid 110 may be dependent upon a production capacity of heat by the one or more production plants 120. Hence, the forecast server 180 may be configured to determine forecast data pertaining to expected production capacity of heat in the one or more production plants 120. The forecast server 180 may be aware of scheduled differences in production capacity of the one or more production plants 120. Hence, the time period of forecasted elevated overall outtake of heat may be determined based on that the expected overall outtake being temporarily elevated relative to the expected production capacity.

The district thermal energy distribution system further comprises a control server 130. The control server 130 may be any type of server comprising a processing unit. The control server 130 may physically comprise one single server device. Alternatively, the control server 130 may be distributed over several server devices. The control server 130 may be comprised in a production plant 120, or at any other suitable location.

The control server 130 is configured to determine a control signal associated with a respective one of the plurality of local distribution systems 150. As will be discussed in more detail below, each local distribution system 150 comprises a local control unit 140. The local control unit 140 is configured to regulate the local heat distribution system's 150 outtake of heat from the district thermal energy distribution grid 110. The control signals generated by the control server 130 are targeted at the respective local control unit 140. Hence, the control server 130 is configured to determine a control signal for each of the plurality of local control units 140. Each respective control signal is time resolved. Each respective control signal comprises information pertaining to time dependent changes in the outtake of heat from the district thermal energy distribution grid 110. The time dependent changes in the outtake of heat comprises information pertaining to a temporary increase in outtake of heat and a temporary decrease in outtake of heat. The temporary decrease in outtake of heat is set to be performed during the determined time period of forecasted elevated overall outtake of heat. The temporary increase in outtake of heat is set to, at least partly, be performed at a time period before the time period of forecasted elevated overall outtake of heat. The time period of temporary increase in outtake of heat before the time period of forecasted elevated overall outtake of heat may be set to be a time period directly before the time period of temporary decrease in outtake of heat. The time period of temporary increase in outtake of heat before the determined time period of forecasted elevated overall outtake of heat may be in the range of 25-150% of the determined time period of forecasted elevated overall outtake of heat. The length of the time period of temporary increase in outtake of heat may be dependent on a value of thermal inertia of the building being heated by the respective local distribution systems 150.

Hence, each respective control signal is time resolved and comprises information pertaining to a temporary increase in heat outtake from the district thermal energy distribution grid 110 before the determined time period of forecasted elevated overall outtake of heat, and information pertaining to a temporary decrease in heat outtake from the district thermal energy distribution grid 110 during the determined time period of forecasted elevated overall outtake of heat.

Each respective control signal may further comprise a time period of temporary increase in heat outtake from the district thermal energy distribution grid 110 after the determined time period of forecasted elevated overall outtake of heat. The time period of temporary increase in heat outtake from the district thermal energy distribution grid 110 after the time period of forecasted elevated overall outtake of heat may be set to be a time period directly after the time period of temporary decrease in heat outtake from the district thermal energy distribution grid 110. The time period of temporary increase in outtake of heat after the determined time period of forecasted elevated overall outtake of heat may be in the range of 25-150% of the determined time period of forecasted elevated overall outtake of heat. The length of the time period of temporary increase in outtake of heat may be dependent on a value of thermal inertia of the building being heated by the respective local distribution systems 150.

Figure 2:
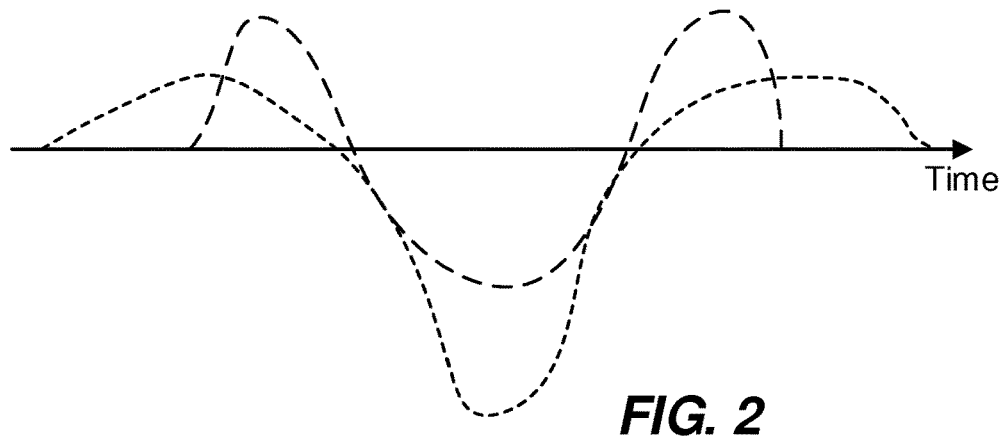
FIG. 2 is a schematic illustration of different control signals used for controlling outtake of heat from the district thermal energy distribution system of FIG. 1.

The control server 130 may be configured to set the time periods of temporary increase in heat outtake from the district thermal energy distribution grid 110 before and after the determined time period of forecasted elevated overall outtake of heat to be symmetric in time. With symmetric in time is here meant that the time periods of temporary increase in heat outtake before and after the determined time period of forecasted elevated overall outtake of heat are equal in time, at least within 10%. Further, the control server 130 may be configured to set the time periods of temporary increase in heat outtake from the district thermal energy distribution grid 110 before and after the determined time period of forecasted elevated overall outtake of heat to be symmetric in outtake of heat. With symmetric in outtake of heat is here meant that the total increase in power of the outtake of heat are equal, at least within 10%. The above symmetric setting of the time periods of temporary increase in heat outtake before and after the time period of forecasted elevated overall outtake of heat is illustrated in connection with FIG. 2. In FIG. 2 two different control signals are illustrated. The half-dashed line illustrates a control signal over time for a building having a relatively long thermal inertia, i.e. it takes relatively long lime for such a building to be heated or to release heat accumulated within the building. The dashed line illustrates a control signal over time for a building having a relatively short thermal inertia, i.e. it takes relatively short lime for such a building to be heated or to release heat accumulated within the building.

It shall be noted that the above settings are just examples of how the set the time periods of temporary increase in heat outtake from the district thermal energy distribution grid 110 before and after the determined time period of forecasted elevated overall outtake of heat. The settings may not be symmetric in time and/or heat outtake. Instead, the time periods of temporary increase in heat outtake from the district thermal energy distribution grid 110 before and after the determined time period of forecasted elevated overall outtake of heat may be individually set. Hence, the settings for pre-heating and after-heating may be individual, i.e. not being dependent upon each other.

The control server 130 is configured to use forecast data from the forecast server 180 as input for generating the respective control signals. Also, other data may be used as inputs to generate the respective control signal. Such other inputs may for example be a desired temperature inside the building 200, a capacity of the one or more production plants 120 or other parameters. The forecast data may be used in several different ways. This will be illustrated by a few examples. According to a first example, if an overall increase in outtake of heat, e.g. hot tap water, is anticipated, i.e. a time period of forecasted elevated overall outtake of heat is determined, the outtake of heat from the district thermal energy distribution grid 110 used for providing comfort heating may be increased before (and possibly also after) this overall increase in outtake of heat. According to another example, if a reduction of heat production at a production plant 120 is known beforehand, e.g. due to scheduled maintenance, this may be seen as a time period of forecasted elevated overall outtake of heat from the district thermal energy distribution grid 110. Then the control server 130 may adjust the time resolved control signals accordingly, so that an increase of outtake of heat for comfort heating is made prior to (and possibly also after) the time period of forecasted elevated overall outtake of heat (in this case the time period of the scheduled maintenance). Hence, the control signals may be used to pre-heat (and possible also after-heat) building before (and possibly also after) a time period of forecasted elevated overall outtake of heat.

The control server 130 is configured to determine a time resolved control signal for each local control unit 140 for a certain time period, for example a week. However, the control server 130 may update the local control unit 140 with a new time resolved control signal more often than this, for instance every day. This contributes to new information being used in a timely manner while avoiding unnecessary communication between the local control unit 140 and the control server 130.

The control server 130 may further be configured to send each respective control signal to the respective local control unit 140. The respective local control unit 140 is configured to receive the respective control signal. For this the control server 130 and each local control units 140 comprises a respective communication module. The communication between the communication modules may be via a dedicated network, over the Internet or a combination thereof. The communication in the dedicated network or the Internet may be wired communication, wireless communication or a combination thereof. The communication may be made over any suitable communication protocol. Non-limiting examples of a communication protocols are Modbus, TCP/IP, Profinet, Profibus, OPC, BACnet, LonTalk, M-bus and MQTT.

Figure 3:
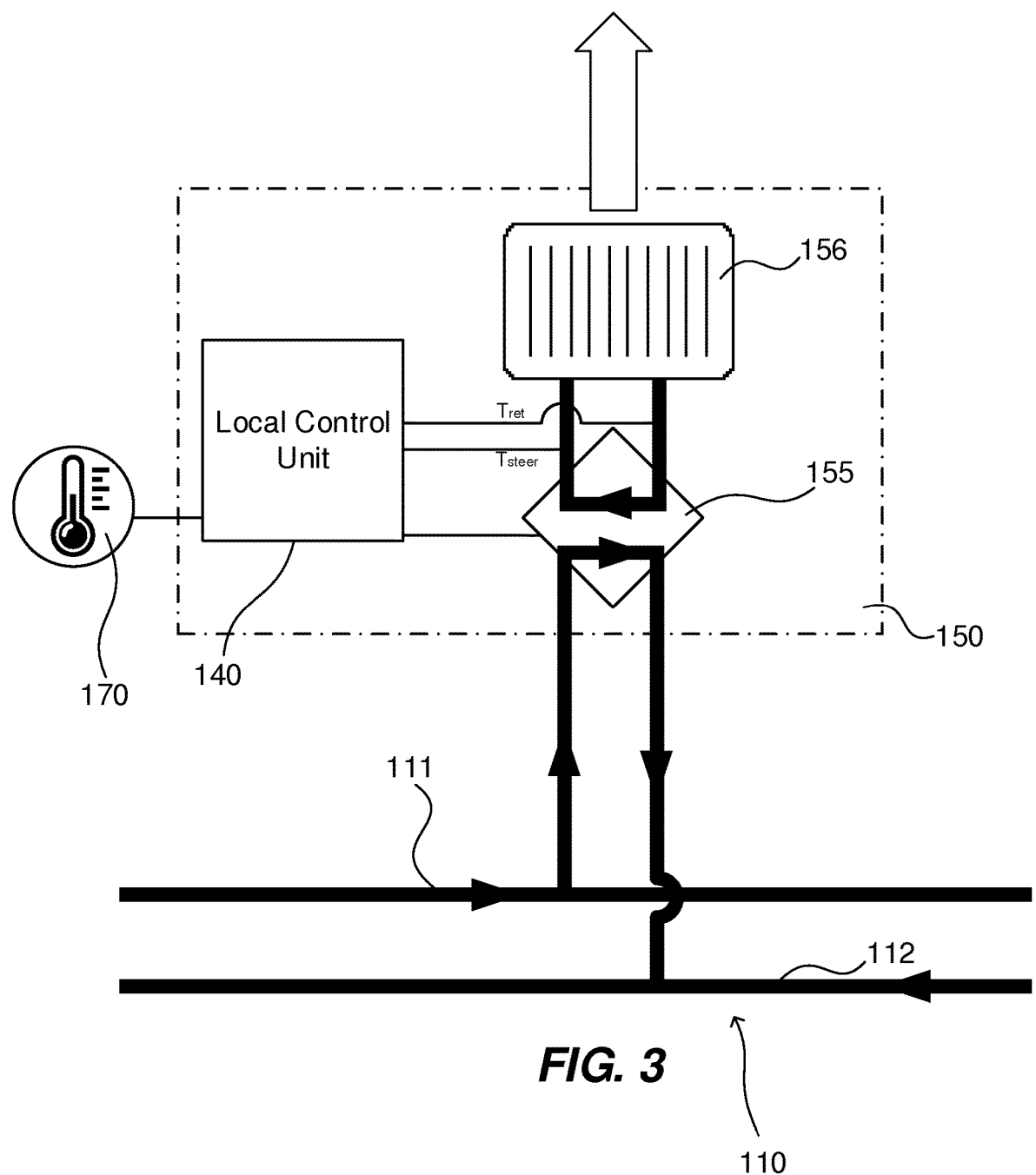
FIG. 3 is a schematic illustration of a local heat distribution system in the district thermal energy distribution system of FIG. 1.

A typical local heat distribution system 150 is shown in more detail in FIG. 3. The local heat distribution system 150 is configured to distribute comfort heating to the thereto associated at least one of more buildings 200. The local heat distribution system 150 may comprise radiators, floor heating systems and other devices configured to distribute comfort heating to a building 200. The local heat distribution system 150 can serve a plurality of buildings 200 or one specific building 200. The local heat distribution system 150 may be located inside a building 200. The local heat distribution system 150 may at least partly be located outside a building 200.

The local heat distribution system 150 comprises a heat extractor 155. The heat extractor 155 is configured to extract heat from the district thermal fluid of the district thermal energy distribution grid 110. The heat extractor 155 is further configured to deposit the extracted heat into local thermal fluid of the local heat distribution system 150. The local thermal fluid may be any fluid suitable for transporting thermal energy. According to a non-limiting example, the local thermal fluid is water. However, according to other embodiments other local thermal fluid may be used. Some non-limiting examples are ammonia, oils, alcohols and anti-freezing liquids such as glycol. The heat transfer liquid may also comprise a mixture of two or more of the heat transfer liquids mentioned above, such as water mixed with an anti-freezing liquid or an anti-corrosion liquid.

The local thermal fluid is separate from the district thermal fluid. Hence, the local thermal fluid of the local heat distribution system 150 is typically not in fluid connection with the district thermal fluid of the district thermal energy distribution grid 110.

As mentioned above, the local heat distribution system 150 is thermally connected to the district thermal energy distribution grid 110 via the heat extractor 155. The heat extractor 155 may be a heat exchanger. Alternatively, the heat extractor 155 may be a heat pump. The use of a heat exchanger or heat pump is depending on the temperature of the district thermal fluid and the wanted temperature of the local thermal fluid.

The heat extractor 155 may be controlled by a regulator. The regulator may be any type of regulator suitable for regulating a temperature of a feed of heat transfer fluid. For example, the regulator may be a P, PI, PD, PID-controller or more advanced cascaded controllers. The regulator may in this way influence the local distribution system's outtake or use of heat.

The local heat distribution system 150 is further configured to distribute the heated local thermal fluid of the local heat distribution system 150 to a thermal element 156. The thermal element 156 may be any device configured to provide comfort heating to the building 200. The thermal element 156 may e.g. be a radiator or floor heating system. Heat may thereafter be emitted to the building wherein the local distribution system 150 is located via the thermal element 156. The local distribution system 150 may comprise one or more thermal element 156.

Further, as mentioned above, each local heat distribution system 150 comprises a local control unit 140. The local control unit 140 is configured to regulate the outtake of heat from the district thermal energy distribution grid 110 to the local heat distribution system 150. Hence, the local control unit 140 is configured to decrease or increase the local heat distribution system's 150 outtake of heat from the district thermal energy distribution grid 110. The outtake at the heat extractor 155 of heat from the district thermal energy distribution grid 110 to the local heat distribution system 150 may be regulated based on one or more values related to temperature. The values related to temperature may be one or more of the following values: a temperature, $T_{steer}$, of the local thermal fluid exiting the heat extractor 155, a temperature, $T_{return}$, of local thermal fluid entering the heat extractor 155, and a temperature. $T_{mes}$, outside the building 200 associated with the local heat distribution system 150. $T_{mes}$ is typically determined just outside the building wherein the local distribution system 150a is located.

One or more of the one or more values related to temperature may be sensed by a respective temperature sensor. For example, a temperature sensor 170 may be configured to measure the temperature, $T_{mes}$, outside the building 200.

The local control unit 140 may determine a base steering temperature based on $T_{mes}$ to be used as a set-point temperature. This set-point temperature may then be further adjusted based on a desired temperature inside the building 200. The local control unit 140 may control the local heat distribution system's 150 outtake of heat from the district thermal energy distribution grid 110 via a steering signal $T_{steer}$. The local control unit 140 or the local heat distribution system 150 may comprise a PID-controller to control an outtake from the district thermal energy distribution grid 110 via heat extractor 155.

As mentioned above, the local control unit 140 is adapted to receive a control signal from the control server 130. The local control unit 140 is further configured to regulate the local heat distribution system's 150 outtake of heat from the district thermal energy distribution grid 110 based on the received control signal.

The control signal may, for example, be a temperature offset. The offset may be an actual temperature value with which a local control unit should adjust the outtake from the distribution grid. The actual value may be a positive or negative value. The offset may be a percentage value to be applied to the current or calculated outtake. The offset may be determined according to the inertia of each building combined with the need to steer their aggregated need of effect connected to production units. Larger offset to handle larger steering needs and smaller offset to handle smaller steering needs.

Independently, a local control unit 140 may determine the temperature $T_{mes}$. As mentioned above, $T_{mes}$ may be determined outside of the building with which it is associated. The local control unit 140 may be configured to control the associated local heat distribution system's 150 outtake of heat from the district thermal energy distribution grid 110 based on $T_{mes}$. The local control unit 140 may further determine a base steering temperature for the associated local heat distribution system 150 based on $T_{mes}$. The base steering temperature is a temperature controlling the local heat distribution system's 150 outtake of heat from the district thermal energy distribution grid 110. The base steering temperature may be a set-point temperature for the local thermal fluid.

The local control unit 140 may adjust the associated local heat distribution system's 150 outtake of heat from the district thermal energy distribution grid 110 based on the control signal. For example, the local control unit 140 may adjust the base steering temperature based on an offset received via the control signal. If the control signal indicates a temperature value, the local control unit 140 may apply the value on the steering temperature, $T_{steer}$, or if the control signal indicates a percentage value the local control unit 140 may apply the percentage on the steering temperature. For example, the offset may be added or subtracted from the base steering temperature, $T_{steer}$. The local control unit 140 may thereby determine a reduced or increased steering temperature. The reduced or increased steering temperature may be used until the control signal indicates a new offset. The outtake of heat at the local heat distribution system 150 may be adapted accordingly. Each respective control signal may comprise data pertaining to a period of time. The period of time may be in the range of hours to days and even weeks.

Figure 4:
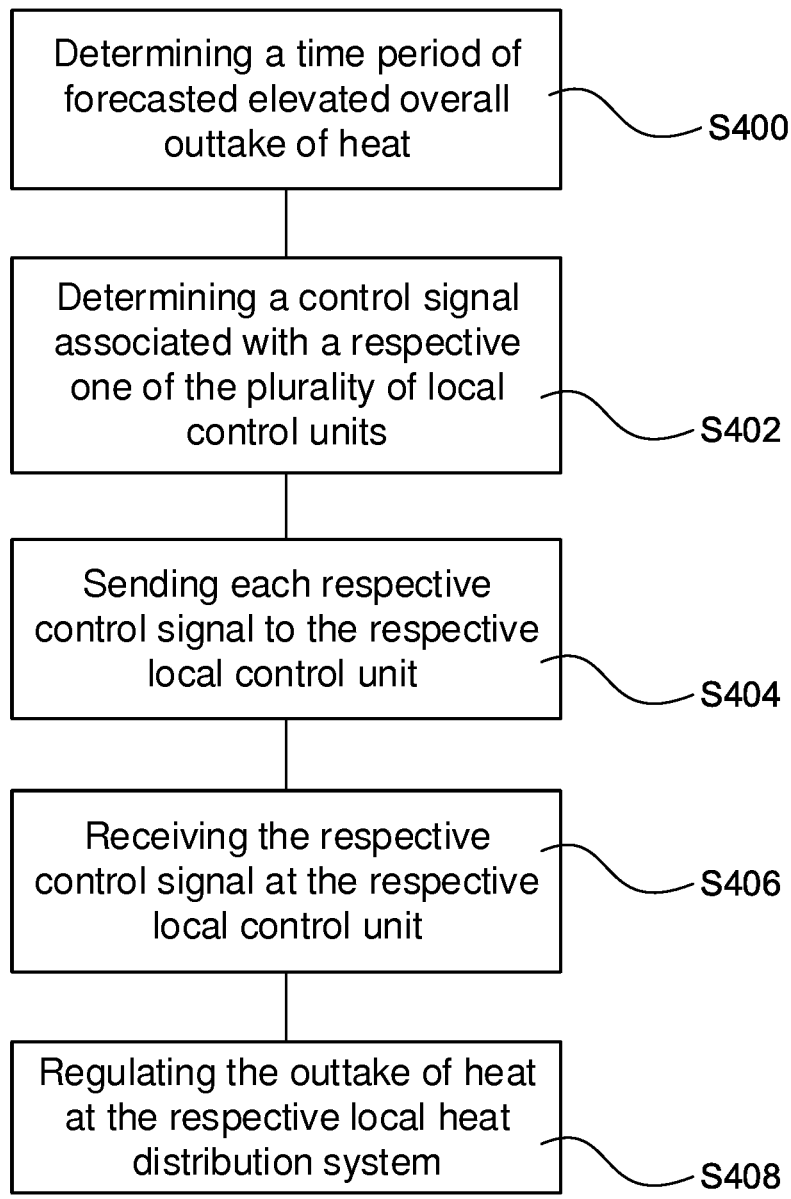
FIG. 4 is a block diagram of a method for controlling a heat distribution system.

With reference to FIG. 4 a method for controlling the above disclosed heat distribution system will now be discussed. The method comprises one or more of the following acts. It shall be understood that the acts of the method may be performed in any suitable order.

Determining S400 a time period of forecasted elevated overall outtake of heat from the district thermal energy distribution grid 110 by local heat distribution systems 150 connected to the district thermal energy distribution grid 110. Determining S402 a control signal associated with a respective one of the plurality of local control units 140. The control signals are determined at the control server 130. Each respective control signal is time resolved. Each respective control signal comprises information pertaining to a temporary increase in heat outtake from the district thermal energy distribution grid before the determined time period, and information pertaining to a temporary decrease in heat outtake from the district thermal energy distribution grid during the determined time period. Sending S404 each respective control signal from the control server 130 to the respective local control unit 140. Receiving S406 the respective control signal at the respective local control unit 140. At each respective local control unit 140, regulating S408 the outtake of heat by the respective local heat distribution system 150 from the district thermal energy distribution grid (110) based on the respective control signal.

The person skilled in the art realizes that the present invention by no means is limited to the preferred embodiments described above. On the contrary, many modifications and variations are possible within the scope of the appended claims.

For example, the district thermal energy distribution system may comprise additional local heat distribution systems 150 not being controlled by local control units configured to receive the control signals generated at the central control server 130 as discussed above. Hence, not all local heat distribution systems 150 of the district thermal energy distribution system need to be controlled in accordance with what has been discussed above.

Further, the control server 130 and the forecast server 180 may be separate servers. Alternatively, the control server 130 and the forecast server 180 may be integrated as one server.

Additionally, variations to the disclosed embodiments can be understood and effected by the skilled person in practicing the claimed invention, from a study of the drawings, the disclosure, and the appended claims.

The invention claimed is:

1. A method for controlling a heat distribution system, the system comprising:
   a district thermal energy distribution grid for a fluid based distribution of heat,
   one or more production plants configured to produce heat and to deliver the heat to the district thermal energy distribution grid, and
   a plurality of local control units, each local control unit being associated with a local heat distribution system, the local heat distribution system being configured to distribute comfort heating in one or more buildings associated to the local heat distribution system, each local control unit further being configured to control the outtake of heat of the associated local heat distribution system from the district thermal energy distribution grid,
   wherein the method comprises:
   determining a time period of forecasted elevated overall outtake of heat from the district thermal energy distribution grid by local heat distribution systems connected to the district thermal energy distribution grid, wherein the time period of forecasted elevated overall outtake of heat from the district thermal energy distribution grid is a time period during which the overall outtake of heat from the district thermal energy distribution grid is above a predetermined threshold, wherein the predetermined threshold is a relative threshold based on a relative amount of energy outtake from the district thermal energy distribution grid compared with a total amount of available energy in the district thermal energy distribution grid, wherein the relative threshold is in the range of 75-90% of a total amount of available energy in the district thermal energy distribution grid; and
   determining, at a control server, a control signal associated with a respective one of the plurality of local control units, wherein each respective control signal is time resolved and comprises:
      information pertaining to a temporary increase in heat outtake from the district thermal energy distribution grid before the determined time period,
      information pertaining to a temporary increase in heat outtake from the district thermal energy distribution grid after the determined time period, and
      information pertaining to a temporary decrease in heat outtake from the district thermal energy distribution grid during the determined time period,
   wherein a time period of the temporary increase in heat outtake from the district thermal energy distribution grid before the determined time period of forecasted elevated overall outtake of heat is in the range of 25-150% of the determined time period of forecasted elevated overall outtake of heat, and
   wherein a time period of the temporary increase in heat outtake from the district thermal energy distribution grid after the determined time period of forecasted elevated overall outtake of heat is in the range of 25-150% of the determined time period of forecasted elevated overall outtake of heat;
   wherein the method further comprises:
      sending the each respective control signal from the control server to the respective local control unit;
      receiving the each respective control signal at the respective local control unit; and
      regulating, at the each respective local control unit and based on the each respective control signal, the outtake of heat by the respective local heat distribution system from the district thermal energy distribution grid.

2. The method according to claim 1, wherein the time period of forecasted elevated overall outtake of heat is in the range of 1 hour to 12 hours.

3. The method according to claim 1, wherein the temporary increase in heat outtake from the district thermal energy distribution grid after the determined time period of forecasted elevated overall outtake of heat is symmetric in time with respect to the temporary increase in heat outtake from the district thermal energy distribution grid before the determined time period of forecasted elevated overall outtake of heat.

4. The method according to claim 1, wherein the temporary increase in heat outtake from the district thermal energy distribution grid after the determined time period of forecasted elevated overall outtake of heat is symmetric in heat outtake with respect to the temporary increase in heat outtake from the district thermal energy distribution grid before the determined time period of forecasted elevated overall outtake of heat.

5. The method according to claim 1, wherein a length of the time period of temporary increase in outtake of heat is dependent on a value of thermal inertia of the building being heated by the respective local distribution system.

6. The method according to claim 1, wherein the act of determining the time period of forecasted elevated overall outtake of heat from the district thermal energy distribution grid by local distribution systems connected to the district thermal energy distribution grid is based on weather forecast data.

7. The method according to claim 1, wherein the act of determining the time period of forecasted elevated overall outtake of heat from the district thermal energy distribution grid by local distribution systems connected to the district thermal energy distribution grid is based on pre-recorded time resolved historical data pertaining to historical overall outtake of heat of local distribution systems connected to the district thermal energy distribution grid.

8. The method according to claim 1, further comprises:
   determining forecast data pertaining to expected production capacity of heat in the one or more production plants; and
   determining forecast data pertaining to expected overall outtake of heat over time from the district thermal energy distribution grid by local heat distribution systems connected to the district thermal energy distribution grid;
   wherein the time period of forecasted elevated overall outtake of heat is determined based on the expected overall outtake being temporarily elevated relative to the expected production capacity.

9. The method according to claim 1, wherein the respective control signal comprises information pertaining to a temperature offset.

10. The method according to claim 9, wherein the method further comprising:
    determining a respective temperature outside the respective one or more buildings associated with a local control unit,
    wherein each local control unit is configured to control the associated local distribution system's outtake of heat from the district thermal energy distribution grid based on the respective determined temperature and the information pertaining to the temperature offset.

11. A heat distribution system comprising:
    a district thermal energy distribution grid for a fluid based distribution of heat,
    a plurality of local control units, each local control unit being associated with a local heat distribution system, the local heat distribution system being configured to distribute comfort heating in one or more buildings associated to the local heat distribution system, each local control unit further being configured to control the outtake of heat of the associated local heat distribution system from the district thermal energy distribution grid, and
    a server having a processing unit configured to:
      determine a time period of forecasted elevated overall outtake of heat from the district thermal energy distribution grid by local heat distribution systems connected to the district thermal energy distribution grid, wherein the time period of forecasted elevated overall outtake of heat from the district thermal energy distribution grid is a time period during which the overall outtake of heat from the district thermal energy distribution grid is above a predetermined threshold, wherein the predetermined threshold is a relative threshold based on a relative amount of energy outtake from the district thermal energy distribution grid compared with a total amount of available energy in the district thermal energy distribution grid, wherein the relative threshold is in the range of 75-90% of a total amount of available energy in the district thermal energy distribution grid;
      determine a control signal associated with a respective one of the plurality of local control units, wherein each respective control signal is time resolved and comprises:
      information pertaining to a temporary increase in heat outtake from the district thermal energy distribution grid before the determined time period,
      information pertaining to a temporary increase in heat outtake from the district thermal energy distribution grid after the determined time period, and
      information pertaining to a temporary decrease in heat outtake from the district thermal energy distribution grid during the determined time period,
    wherein a time period of the temporary increase in heat outtake from the district thermal energy distribution grid before the determined time period of forecasted elevated overall outtake of heat is in the range of 25-150% of the determined time period of forecasted elevated overall outtake of heat, and
    wherein a time period of the temporary increase in heat outtake from the district thermal energy distribution grid after the determined time period of forecasted elevated overall outtake of heat is in the range of 25-150% of the determined time period of forecasted elevated overall outtake of heat;
    wherein the server further comprises a communication module configured to send the each respective control signal from the server to the respective one of the plurality of local control units,
    wherein the respective local control unit further comprises:
      a communication module configured to receive the respective control signal, and
      a heat extractor configured to regulate the outtake of heat by the associated local heat distribution system from the district thermal energy distribution grid based on the each respective control signal.

12. A server comprising:
    a processing unit configured to:
      determine a time period of forecasted elevated overall outtake of heat from a district thermal energy distribution grid by local heat distribution systems connected to the district thermal energy distribution grid, wherein the time period of forecasted elevated overall outtake of heat from the district thermal energy distribution grid is a time period during which the overall outtake of heat from the district thermal energy distribution grid is above a predetermined threshold, wherein the predetermined threshold is a relative threshold based on a relative amount of energy outtake from the district thermal energy distribution grid compared with a total amount of available energy in the district thermal energy distribution grid, wherein the relative threshold is in the range of 75-90% of a total amount of available energy in the district thermal energy distribution grid, and determine a control signal associated with a respective one of a plurality of local control units, wherein each respective control signal is time resolved and comprises:
  information pertaining to a temporary increase in heat outtake from the district thermal energy distribution grid before the determined time period,
  information pertaining to a temporary increase in heat outtake from the district thermal energy distribution grid after the determined time period, and
  information pertaining to a temporary decrease in heat outtake from the district thermal energy distribution grid during the determined time period,
  wherein a time period of the temporary increase in heat outtake from the district thermal energy distribution grid before the determined time period of forecasted elevated overall outtake of heat is in the range of 25-150% of the determined time period of forecasted elevated overall outtake of heat, and
  wherein a time period of the temporary increase in heat outtake from the district thermal energy distribution grid after the determined time period of forecasted elevated overall outtake of heat is in the range of 25-150% of the determined time period of forecasted elevated overall outtake of heat; and wherein the server further comprises a communication module configured to send the each respective control signal from the server to the respective one of the plurality of local control units to regulate the outtake of heat by an associated local heat distribution system.

* * * * *